Patented May 13, 1941

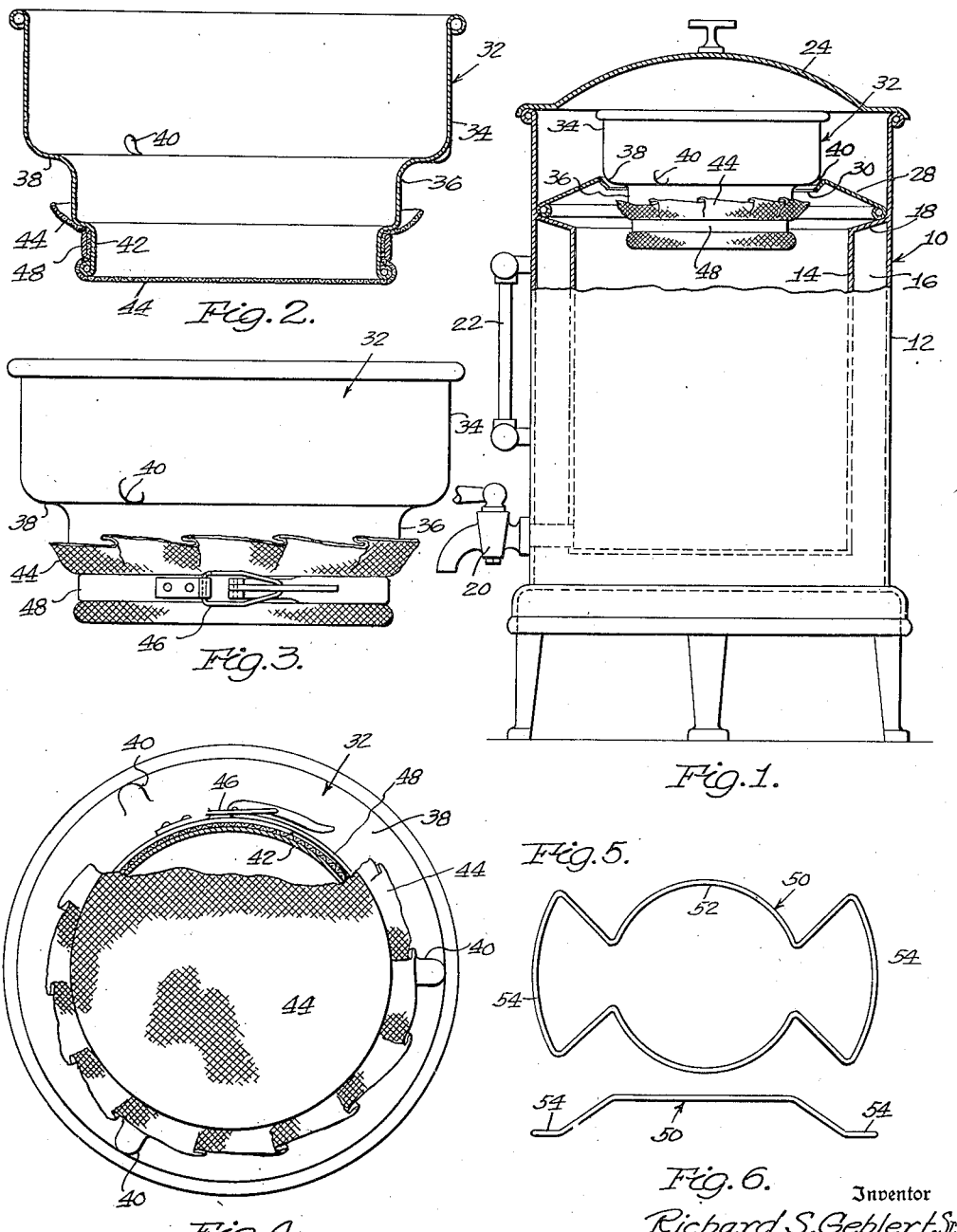

2,241,990

UNITED STATES PATENT OFFICE 2,241,990

COMMERCIAL COFFEE URN

Richard S. Gehlert, Sr., and Richard S. Gehlert, Jr., Detroit, Mich., assignors to R. S. Gehlert & Co., Detroit, Mich., a corporation of Michigan Application July 18, 1938, Serial No. 219,814

1 Claim. (Cl. 53—3)

This invention relates, in general, to an improved coffee-making device and, in particular, to a device which is adapted for commercial use, such as for use in restaurants, inns, hotels and other establishments wherein coffee is made and consumed on a large scale.

One of the main objects of this invention is to provide a device which is adapted for substantially shortening the period of ground coffee immersion, or infusion, by causing the immediate infusion of the finer granules of the ground coffee and the simultaneous flotation of the coarser granules of said ground coffee in a body and subsequent gradual and continuous infusion of the latter by saturation of the individual granules thereof coming successively into direct contact with the water, whereby the desirable and readily soluble constituents are extracted from the floating ground coffee by the water while the undesirable and not so readily soluble constituents thereof remain intact therein, the brew for draw-off being uniformly strong and flavored from beginning to end.

Another object of the invention is to provide an improved coffee-making device which is adapted for making more and better brewed coffee per unit weight of ground coffee than obtainable from devices at present in use, the resulting grounds containing a minimum of flavor-giving oily content and an undisturbed fibrous content, thus indicating that said brewed coffee contains the maximum goodness and flavor obtainable from said ground coffee and a minimum of acidity which would result from a continued disturbance of said fibrous content.

Another object herein is to provide an improved coffee-making device which requires a single handling of ground coffee and water without the necessity of subsequent handling during brewing thereof, said device being so constructed as to cause all water to contact all ground coffee evenly before the product of extraction is ready for consumption, said construction effectuating the uniformity in taste, flavor and strength of each successive draw-off of brewed coffee for consumption.

Still another object of the invention is to provide an improved coffee-making device which requires a single water-pouring operation, all of said water being poured onto all of the ground coffee contained within said device at one time, and the device being adapted for causing the finer granules of said ground coffee to become immediately saturated and the coarser granules to float upon said water and subsequently to become gradually saturated and sink, all the resulting product being directed by said device through a limited, restricted, perforated area within and normal to the flow therethrough whereby the uniformity in taste, strength and aroma of the product during the entire brew is assured.

Another object herein is to provide an improved coffee-making device which minimizes the required number of steps necessary per brewing operation, which enhances the sanitation thereof, and which eliminates the unpleasant sight which at present most generally accompanies coffee-brewing operations.

Another object is to provide the aforementioned device with means whereby said device is adaptable for use with practically any urn of any size.

Other objects and advantages of the invention will become readily apparent from a reference to the following specification made in conjunction with the accompanying drawing in which:

Figure 1 is a side elevational view of a coffee urn, partially broken away to show in section details of the invention incorporated therein;

Fig. 2 is an enlarged vertical sectional view of the novel device incorporated in the urn shown in Fig. 1;

Figs. 3 and 4 are side and bottom elevational views, respectively, of the device shown in section in Fig. 2, and Figs. 5 and 6 are top and side elevational views, respectively, of a modified form of supporting means for the device shown in Figs. 2, 3 and 4.

Referring to Fig. 1, the ordinary commercial coffee urn is shown, generally at 10, said urn comprising spaced outer and inner walls 12 and 14, respectively, between which is the usual steam chamber 16. Wall 14 is marginally flanged outwardly at its upper end, as at 18, and is sealed thereat to wall 12 to hermetically close the chamber 16 therebelow. Urn 10 is also provided with the usual spigot 20, gauge 22 and cover 24, spigot 20 and gauge 22 being located in their proper positions at their proper levels and in communication with the brew-receiving chamber formed by and within the inner wall 14, and cover 24 being removably supported on the upper end of wall 12. Means (not shown) may be provided in any desired manner for heating the steam chamber 16. An annular collar 28, having a central opening 30, is supported above the brew-receiving chamber by the flange 18 of wall 14.

Adapted for being supported by the collar 28 within the opening 30 is a metallic, imperforate, cylindrical member, generally indicated at 32, member 32 being open ended and comprising a pair of integral sections 34 and 36 between which is formed a shoulder 38, sections 34 and 36 extending outwardly and inwardly, respectively, of opening 30, and shoulder 38 cooperating with collar 28 for supporting member 32 thereupon with respect to opening 30. Shoulder 38 is preferably provided with radially extending ribs 40 for preventing a pure metal-to-metal contact between the adjacent surfaces of collar 28 and shoulder 38, said provision aiding in the ready removal of member 32 from collar 28 at all times and under any conditions.

The lower end of section 36 of member 32 is preferably formed with an annular depression 42 (see Fig. 2), and a section of filtering material 44, adapted for restrictively closing in a single plane which is normal to the longitudinal axis of member 32 the lower end of member 32, is adapted for being removably held in place to said member 32 by means of a clamping member 46 having a band 48 secured between its ends to said clamp for binding said filter 44 into said depression 42, said band 48 being adjustable in length by manual operation of said clamp 46 for holding filter 44 onto member 32 or for permitting its removal therefrom or the replacement thereof. It will be noted in assembly that filter 44, if of fabric, is held tautly across the lower end of member 32, but it is to be understood that filter 44 can be metallic, though, as such, same will not be as desirable as fabric.

Instead of the collar 28 shown in Fig. 1 for supporting the member 32 in proper relation to urn 10 there may be provided, as shown in Figs. 5 and 6, an endless adaptor, generally indicated at 50, said adaptor being centrally formed to provide an opening 52 into which is received the section 36 of member 32 and the walls of which adaptor defining said opening providing support for the shoulder 38. Adaptor 50 is also formed to provide laterally extending ears 54 which cooperate with the flange 18 to support said adaptor 50 and member 32 thereat. Adaptor 50 is constructed of resilient but ductile metal so that same may be bent to vary the size of opening 52 and the space between ears 54 so as to accommodate various sizes of members 32 and so as to be accommodated by various sizes of urns 10.

A given quantity of ground coffee is placed in member 32 on top of filter 44 and the proper amount of boiling water is then poured thereover. If filter 44 is non-metallic, which is preferred, it acts like a taut canvas and prevents immediate passage of fluid therethrough, the finer granules of coffee very quickly becoming saturated and settling evenly over said filter while the coarser granules rise to the water surface to float thereupon. Settling of these finer granules on the filter enhances the passage therethrough and finished flavoring thereby of the liquid adjacent thereat prior to the saturation of the floating coarser granules, so that the brew first passing into the brew-receiving chamber through said settled granules is as highly flavored and as fit to drink as any subsequent quantity passing into said chamber during the saturation of said coarser granules. Meanwhile, the water replaces the flavor-giving cellular content of those floating coarse granules immediately adjacent same and said cellular content, being heavy, sinks downwardly through the fluid mass in streams separate and distinct for each granule, the granules following and settling evenly in substantially free suspension over the already coated filter 44, there being no lateral diffusion during the down-passage of the liquor streams because of their being no external agitation, the liquor passing substantially quickly, continuously and uniformly into the brew-receiving chamber through the fluffy body of suspended grounds and the filter 44. As soon as said coarser granules immediately adjacent the water surface have become infused by said saturation and sink, they are replaced by those which are unsaturated and disposed immediately thereabove, and then they are replaced by others, etc., until substantially the entire floating mass has been infused by this gradual and continuous process of saturation.

Lack of agitation, which would occur from repouring, prevents break-down of the body structure of the ground coffee and, therefore, prevents the brew from being sour and acetic in taste. The brew, on the other hand, has an aroma which is pleasant, a taste which is sweet, and a flavor which is pleasantly strong and uniform from one draw-off to the next. Each and every granule of ground coffee has an equal period of infusion which is sufficient for the extraction therefrom of the readily soluble and most desirable constituents of the coffee but which is insufficient for the extraction from the ground coffee of its less desirable and not as readily soluble constituents. The member 32 absolutely and positively guides the brew through the grounds and filter 44, the grounds being settled in a non-compact state of substantially free suspension in the section 36 of member 32 on said filter and being easily and readily removable therefrom, after said member has successfully caused the flotation of substantially the entire body of said ground coffee and its subsequent continuous, though gradual, and independently phased infusion by saturation.

The filter 44, if fabric, is preferably replaced by a new one for each brew, or thoroughly washed thereafter, for there is bound to be an odor to the coffee-soaked cloth. Replacement is easily accomplished by proper manipulation of the clamping means 46—48, and is not uneconomical because of the relatively small size and cost of the cloth and the advantages to be gained by such replacement. It is pointed out that said small size of said cloth, which forms only one side of the ground coffee container 32 as compared to a sack which is commonly used, and which is of an area less than one-tenth that of said sack, predeterminately defines the path of fluid flow and also "soaks up" much less of the fluid passing therethrough. This means less waste in brewed coffee, and it also means that each granule of coffee, being directly within the path of fluid flow and combining with others to form an evenly distributed, lightly settled, suspended coating of uniform thickness on said cloth, has any remaining flavor-containing cells therein absorbed by said fluid so that said absorption is maximum.

Although the invention has been described with some detail it is not intended that such description be definitive of the limits of the scope of the inventive idea. The right is reserved to make such changes in the arrangement of parts, in the specification and in the drawing as will come within the purview of the attached claims.

What we claim is:

A coffee-making apparatus comprising, a vertically disposed storage tank having outer and inner walls concentrically arranged with respect to each other for defining an annular heating chamber therebetween and inter-joined by a transverse wall for isolating said chamber from the chamber defined by and within said inner wall, an annular supporting plate removably supported at its outer periphery on said transverse wall and formed around its inner periphery with an annular, depressed seat, an open-ended container having an upper cylindrical wall with a diameter slightly greater than the inner diameter of said seat, a middle cylindrical wall integral with said upper wall and having a diameter slightly less than said seat diameter, a lower cylindrical wall integral with said middle wall and having a diameter slightly less than said middle wall diameter and an annular rib at the base of said lower wall and extending radially outwardly from the latter, a section of filtering material fitted over the lower end of said container in overlapping engagement with said rib and said lower wall, an annular clamping member arranged about said material on said lower wall above said rib for removably holding said material in place over said lower end, and a plurality of annularly spaced protuberances on the base of said upper wall and engageable with said seat for supporting said container on said plate with the wall portions between said protuberances spaced from said seat.

RICHARD S. GEHLERT, Sr.
RICHARD S. GEHLERT, Jr.